United States Patent [19]

Collins et al.

[11] Patent Number: 4,653,013

[45] Date of Patent: Mar. 24, 1987

[54] ALTERING SPATIAL CHARACTERISTICS OF A DIGITAL IMAGE

[75] Inventors: Arthur K. Collins, Waukesha; Norbert J. Pelc, Wauwatosa; Susan T. Wallenslager, Waukesha, all of Wis.

[73] Assignee: General Electric Company, Milwaukee, Wis.

[21] Appl. No.: 672,609

[22] Filed: Nov. 19, 1984

[51] Int. Cl.[4] .............................................. G01D 15/14
[52] U.S. Cl. ..................................... 364/518; 346/154
[58] Field of Search ............................. 364/518, 519; 346/76 PH, 154, 160, 107, 108; 400/120; 214/216 PH

[56] References Cited

U.S. PATENT DOCUMENTS 4,524,368  6/1985  Inui et al. .............................. 364/518

Primary Examiner—Arthur G. Evans
Attorney, Agent, or Firm—Flehr, Hohbach, Test, Albritton & Herbert

[57] ABSTRACT

The values of pixels in a new image matrix are obtained by mapping pixels of the new matrix in the old matrix and then using polynomial interpolation of a plurality of values of pixels in the old matrix to obtain values of interim pixels in the new matrix and then using polynomial interpolation of a plurality of interim values to obtain final values of pixels in the new matrix. A precalculated table of weighting coefficients based on offset of a new pixel from an adjacent old pixel is used to expedite the polynomial interpolation.

8 Claims, 4 Drawing Figures

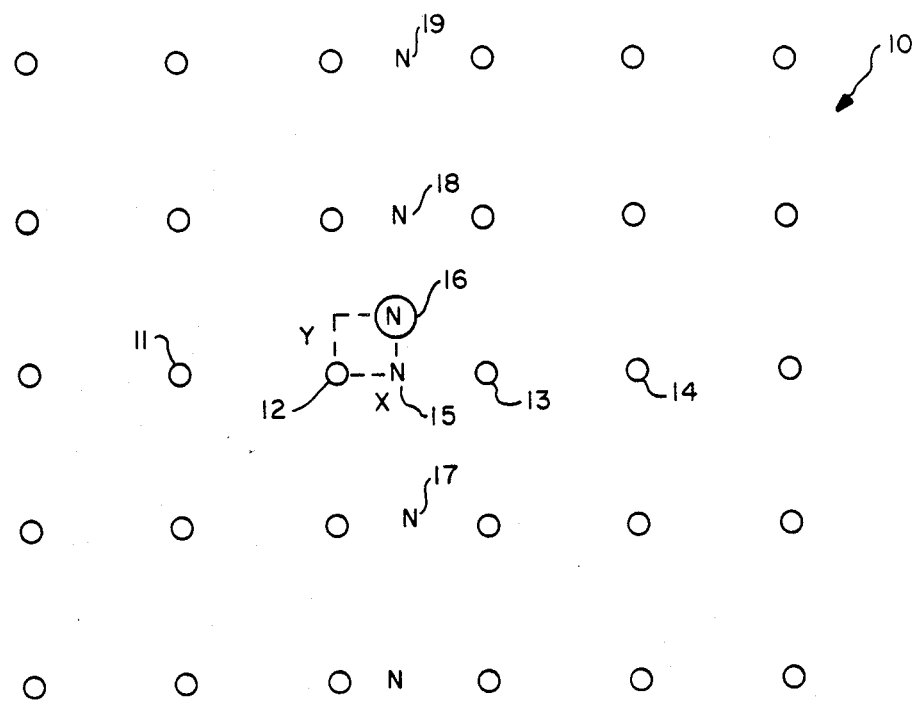
FIG.—1
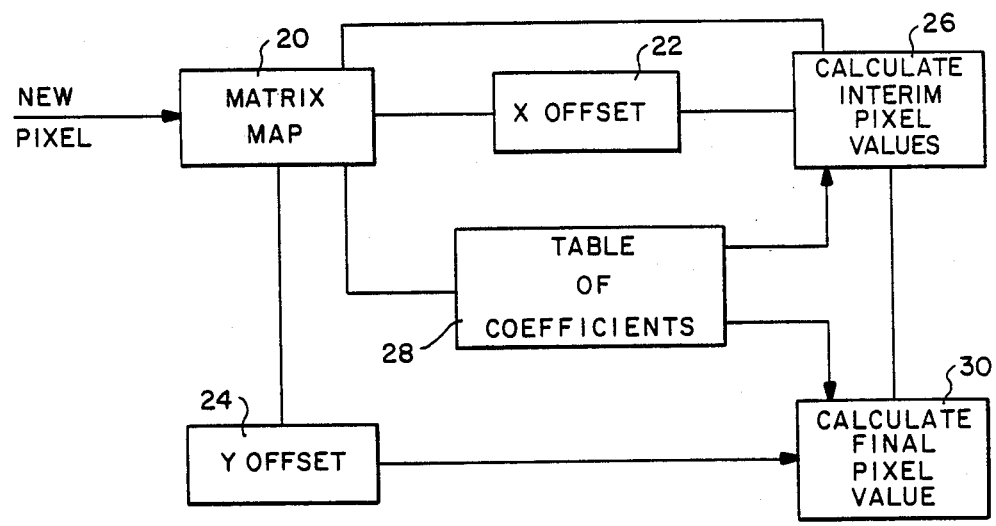
FIG.—2

ALTERING SPATIAL CHARACTERISTICS OF A DIGITAL IMAGE

BACKGROUND OF THE INVENTION

This invention relates generally to the display of digital images and more particularly the invention relates to an improved method and means for establishing new pixel values for new pixel locations from an image having established pixel locations and values. The new pixel locations could be chosen, for example, to magnify, minify, translate or distort the original image.

The display of a digital image, for example on a video screen or photographic film, is controlled by a memory which stores values for picture elements or pixels. In a video display, an electron beam is scanned across the phosphor-coated surface of the display screen, and the current of the electron beam is controlled in accordance with the stored values to thus control the light intensity of each pixel element as the electron beam impinges on the phosphor material. Alternatively, the digital image can be transferred to photographic film by scanning a laser beam across the film and modulating the intensity of the laser beam in accordance with the stored pixel values.

In any of the image processing tasks mentioned above, values for pixels at locations different than the original pixel locations must be arrived at. The simplest technique for doing this is to use, for each output pixel, the value of the nearest input pixel. Minification is then performed by selectively deleting pixels while to magnify some or all of the pixel values are replicated. The resulting image quality is often not satisfactory. Values for the new pixel locations can be arrived at using linear interpolation in both directions. However, images magnified using this method are blurry and structured noise is sometimes visible.

Improved fidelity and sharpness can be realized if the interpolation of new pixel values is a higher order polynomial interpolation. For example, in a third order interpolation of a pixel value in a new matrix to be described, the values of sixteen adjacent pixels in the old matrix are used. Generally, the higher the order of the polynomial used, the more fidelity and sharpness the new image will have. However, as the order of the polynomial interpolation increases, more computations are required in determining the new pixel values.

SUMMARY OF THE INVENTION

Accordingly, an object of the present invention is an efficient method and apparatus for implementing polynomial interpolation of pixel values in a new matrix using pixel values of an old matrix.

A feature of the invention is the implementation of polynomial interpolation by a weighted combination of the input pixels.

Another feature is the use of a table of coefficients for polynomial interpolation of pixel values in a new matrix which are based on one dimensional (e.g., x or y) incremental spacing from pixels in an old matrix.

Briefly, the pixels in the new pixel matrix are mapped in the old pixel matrix to obtain x and y offsets from old pixels. The offset for each new pixel in one dimension (e.g., x dimension) is determined and values for interim pixels are interpolated or obtained using values of a plurality of old pixels adjacent to each new pixel in the one dimension. The final pixel values are then obtained by polynomial interpolation in the other dimension (e.g., y dimension) using the calculated values of interim pixels.

Importantly, the weighting coefficients for the one dimensional interpolations are precalculated for given incremental values. Thus, the time consuming tasks of calculating polynominal coefficients and evaluating polynomials are not required during the calculation of new pixel values.

The invention and objects and features thereof will be more readily apparent from the following detailed description and appended claims when taken with the drawings, in which:

BRIEF DESCRIPTION OF THE DRAWINGS

FIG. 1 is an illustration of a portion of a matrix of known pixel values and a matrix of pixels whose values are to be calculated.

FIG. 2 is a functional block diagram of computer apparatus for determining new pixel values in accordance with the invention.

DETAILED DESCRIPTION OF THE PREFERRED EMBODIMENTS

Figure 3:
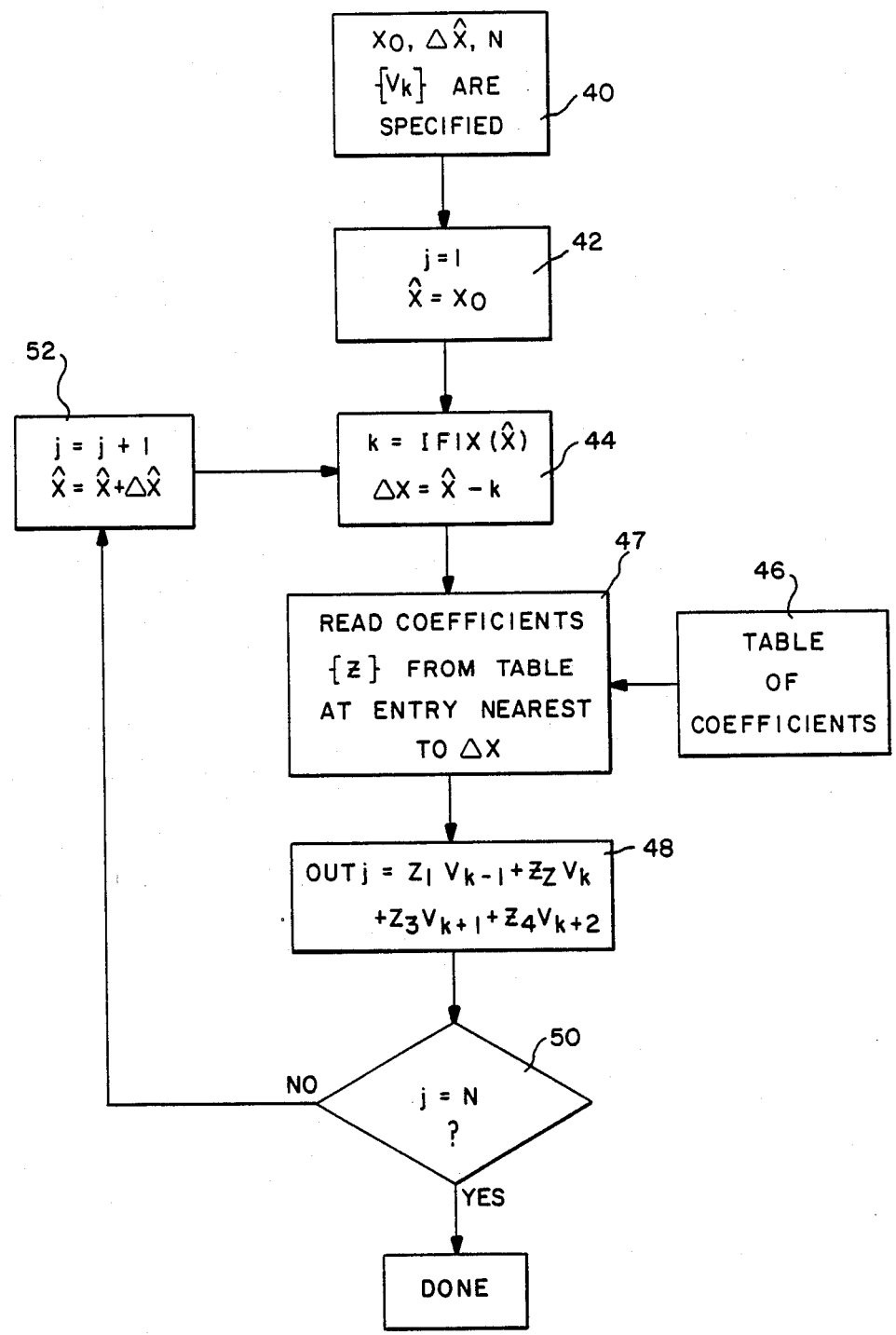
FIG. 3 is a program flow diagram for calculating new pixel values in accordance with one embodiment of the invention.

Referring now to the drawing, FIG. 1 illustrates a portion of a matrix 10 of pixels of known value such as the pixels 11, 12, 13 and 14 in one horizontal row of the matrix. Assume that a new matrix of pixels is mapped on the old matrix 10 and the new pixel 16 is in the new matrix. As illustrated, the pixel 16 is offset from pixel 12 by a horizontal distance, $\Delta x$, and a vertical distance, $\Delta y$.

In general, the value of a new pixel 16 is arrived at by treating the region of the image in the neighborhood of pixel 16 as some function $f(x,y)$ the details of which depend on the values of neighboring pixels. The value assigned to pixel 16 is then the value of the function $f(x,y)$ at the position of pixel 16. This process is repeated for all the output pixels to arrive at the interpolated image. In polynomial interpolation as used in conjunction with this invention, the function $f(x,y)$ is a polynomial function of x and y. The process of calculating the output pixel value then involves calculating the polynomial coefficients using input pixels neighboring the output pixel and then evaluating the polynomial. Typically, the number of input pixels used is equal to the number of polynomial coefficients of $f(x,y)$ that must be determined. For example, suppose we wish to use as a model the polynomial:

$$f(x,y) = a_0 + a_1 x + a_2 x^2 + a_3 y + a_4 y^2 + a_5 xy + a_6 x^2 y + a_7 xy^2 + a_8 x^2 y^2 \tag{1}$$

Suppose we want to compute the value for a pixel to be located at $(\hat{x}, \hat{y})$. Coefficients $\{a_0, a_1 \ldots a_8\}$ such that $f(x,y)$ exactly matches the values of nine input pixels surrounding $(\hat{x},\hat{y})$ are calculated.

For the model of Equation 1 this is done by solving a system of nine equations (one for each input pixel) with nine unknowns (the coefficients). The coefficients are then used to calculate the output pixel value:

$$f(\hat{x}, \hat{y}) = a_0 + a_1 \hat{x} + a_2 \hat{x}^2 + a_3 \hat{y} + a_4 \hat{y}^2 + a_5 \hat{x} \hat{y} + a_6 \hat{x}^2 \hat{y} + a_7 \hat{x} \hat{y}^2 + a_8 \hat{x}^2 \hat{y}^2 \tag{2}$$

If the two dimensional polynominal model contains all terms up to nth order in either variable, where n is any integer, then the two dimensional interpolation process can be broken down into one-dimensional interpolations. For example, the first step would interpolate in the x direction and arrive at interim pixel values for pixels $(\hat{x}, y_e)$ where $y_e$ takes on the values of y for rows neighboring the desired output pixel. Then, an interpolation in y is used, using the interim pixel values as inputs, to compute the output pixel value for the desired pixel at $(\hat{x}, \hat{y})$. It will now be shown that for polynomials that include terms to nth order in either coordinate the two dimensional interpolation can be simplified into two one-dimensional interpolation steps. The polynomial model we use is:

$$f(x, y) = \sum_{i=0}^{n} \sum_{j=0}^{n} a_{ij} x^i y^j \tag{3}$$

In a $(n+1)$ square array of pixels surrounding the desired output location $(\hat{x}, \hat{y})$ x will take on values $\{x_o, x_1, \ldots, x_n\}$ while y will take on values $\{y_o, y_1 \ldots, y_n\}$. Let $v(x_k, y_e)$ be the value for the pixel at $(x_k, y_e)$. We need to arrive at a value for a new pixel at $(\hat{x}, \hat{y})$. The classical way to do this is to generate a set of coefficients $\{a_{ij}\}$ such that $$\sum_{i=0}^{n} \sum_{j=0}^{n} a_{ij} x_k^i y_e^j = v(x_k, y_e) \tag{4}$$

is true for all the $(n+1)^2$ pixels in the square region surrounding $(\hat{x}, \hat{y})$, and then using these to calculate the desired output $$v(\hat{x}, \hat{y}) = \sum_{i=0}^{n} \sum_{j=0}^{n} a_{ij} \hat{x}^i \hat{y}^j \tag{5}$$

Consider an interim pixel location at $(\hat{x}, y_e)$. Define $b_{ie}$ by:

$$b_{ie} = \sum_{j=0}^{n} a_{ij} y_e^j \tag{6}$$

Note that the coefficients $\{b_{ie}\}$ depend on the y coordinate $y_e$ but are indpendent of x. We can now rewrite Equation 4 as:

$$\sum_{i=0}^{n} b_{ie} x_k^i = v(x_k, y_e) \tag{7}$$

and Equation 5 for the interim pixel becomes:

$$v(\hat{x}, y_e) = \sum_{i=0}^{n} b_{ie} \hat{x}^i \tag{8}$$

Equations 7 and 8 define an nth order one-dimensional polynomial interpolation in x along the row $y = y_e$, to arrive at a value for the interim pixel at $(x, y_e)$. It is clear, though, that the value arrived at for this interim pixel by one dimensional interpolation is exactly the value that would be arrived at by the two-dimensional process. This is true for all pixel positions along rows of the old matrix. This can be understood intuitively by noting that for any fixed value of y, Eq. 3 is an nth order polynomial in x, as in the one dimensional model, and if the two agree at $(n+1)$ points along the row, they will agree everywhere along the row.

Suppose that values for interim pixels $(x, y_e)$ for the $(n+1)$ rows surrounding the pixel of interest have been calculated by nth order polynomial interpolation. Again, the interim pixel values agree with what the full two-dimensional method would have given at those locations. Define $$c_j = \sum_{i=0}^{n} a_{ij} \hat{x}^i \tag{9}$$

The set $\{c_j\}$ can be computed by finding the coefficients for which $$\sum_{j=0}^{n} c_j y_e^j = v(\hat{x}, y_e) \tag{10}$$

is true for all the interim pixels. Eq. 5 now becomes:

$$v(\hat{x}, \hat{y}) = \sum_{j=0}^{n} c_j \hat{y}^j \tag{11}$$

Equations 10 and 11 define one dimensional nth order polynomial interpolation in the y direction along the column defined by the interim pixels and which also contains the output pixel $(\hat{x}, \hat{y})$. Again, since both equations 5 and 11 are nth order polynomials and since they agree at $(n+1)$ points (the interim pixels) they must give the same value at $(\hat{x}, \hat{y})$. Thus, the two dimensional interpolation can be implemented using simpler one dimensional interpolation steps. Further, it will be clear to those skilled in the art that for the often used steps of image magnification, minification, and translation, many of the interim pixel values needed to calculate one output pixel can be stored and used to calculate other output pixels.

We can now restrict ourselves to dealing with one dimensional interpolation. It will now be shown that the interpolated output value can be calculated as a linear combination of the input pixel values, where the combination coefficients depend on the relative position of the output point with respect to the input points.

We use as a model:

$$f(x) = \sum_{i=0}^{n} a_i x^i \tag{12}$$

Again, the coefficients $a_i$ are arrived at by forcing $$\sum_{i=0}^{n} a_i x_k^i = v_k \tag{13}$$

to be true for the $(n+1)$ pixels surrounding the output location, where $\{x_k\}$ and $\{v_k\}$ are the input pixel locations and values respectively. There are $(n+1)$ equations like Equation 13 which we can write in matrix form:

$$A \cdot X = V \tag{14}$$

A is a row vector containing the polynomial coefficients, X is a square matrix containing the x values raised to the appropriate powers, and V is a row vector containing the pixel values. We solve for A by:

$$A = V \cdot X^{-1} \quad (15)$$

and then find the desired output pixel value by $$f(\hat{x}) = A \cdot \hat{X} \quad (16)$$

where $\hat{X}$ is a column vector containing $\hat{X}$ raised to the appropriate powers. Substituting Equation 15 into Equation 16 and regrouping we get $$f(\hat{x}) = V(X^{-1}\hat{X}) \quad (17)$$

which shows that the output value is a linear combination of the values of the surrounding input pixels. The combination coefficients are given by $(X^{-1}\hat{X})$ and depend on the relative position of the output pixel within the input array but are independent of the specific pixel values. Once the combination coefficients are known, the interpolation requires $(n+1)$ multiplications and $n$ additions.

If the input pixels are equally spaced, the combination coefficients depend only on the normalized distance of the output pixel from the pixel to its left. We define this normalized distance by:

$$\Delta X = \frac{\hat{x} - x_k}{\Delta p} \quad (18)$$

where $x_k$ is the pixel location just to the left of $\hat{x}$ and $\Delta p$ is the spacing between pixels.

One advantage of using an odd number for the polynomial order $n$ is that the number of input points used for each output point, $(n+1)$, is even. Thus, the input points can be symmetrically located about the output. Following is a derivation of the combination coefficients for a third order interpolation $(n=3)$.

The model for this third order interpolation is:

$$f(\hat{x}) = a_0 + a_1 \Delta X + a_2 (\Delta x)^2 + a_3 (\Delta X)^3 \quad (19)$$

Since $x_k$ is the pixel location just to the left of $\hat{x}$, the four pixels to be used have values $V_{k-1}, V_k, V_{k+1}$ and $V_{k+2}$ and their respective $\Delta x$ as values are $-1, 0, 1,$ and $2$ respectively. Using Equation 19, the four equations used to calculate the polynomial coefficients $a_i$ are:

$$a_0 - a_1 + a_2 - a_3 = V_{k-1} \quad (20a)$$

$$a_0 = V_k \quad (20b)$$

$$a_0 + a_1 + a_2 + a_3 = V_{k+1} \quad (20c)$$

$$a_0 + 2a_1 + 4a_2 + 8a_3 = V_{k+2} \quad (20d)$$

Equation 20b defines $a_0$. Adding Equations 20a and 20c yields:

$$2a_0 + 2a_2 = V_{k-1} + V_{k+1} \quad (21)$$

Substituting Equation 20b and regrouping gives an expression for $a_2$:

$$a_2 = \tfrac{1}{2} V_{k-1} - V_k + \tfrac{1}{2} V_{k+1} \quad (22)$$

Subtracting Equation 20a from Equation 20c gives:

$$2a_1 + 2a_3 = V_{k+1} - V_{k-1} \quad (23)$$

Substituting Equations 20b and 22 into Equation 20d and regrouping gives:

$$2a_1 + 8a_3 = -2V_{k-1} + 3V_k - 2V_{k+1} + V_{k+2} \quad (24)$$

Equations 23 and 24 can be solved for $a_1$ and $a_3$:

$$a_1 = -\tfrac{1}{3} V_{k-1} - \tfrac{1}{2} V_k + V_{k+1} - 1/6 V_{k+2} \quad (25)$$

$$a_3 = -1/6 V_{k-1} + \tfrac{1}{2} V_k - \tfrac{1}{2} V_{k+1} + 1/6 V_{k+2} \quad (26)$$

Substituting Equations 20b, 22, 25 and 26 into Equation 19 and combining like terms yields:

$$f(x) = Z_1 V_{k-1} + Z_2 V_k + Z_3 V_{k+1} + Z_4 V_{k+2} \quad (27)$$

where $$Z_1 = -\tfrac{1}{3}(\Delta X) + \tfrac{1}{2}(\Delta X)^2 - 1/6(\Delta X)^3$$

$$Z_2 = 1 - \tfrac{1}{2}(\Delta X) - (\Delta X)^2 + \tfrac{1}{2}(\Delta X)^3$$

$$Z_3 = \Delta X + \tfrac{1}{2}(\Delta X)^2 - \tfrac{1}{2}(\Delta X)^3 \quad (28)$$

$$Z_4 = -1/6(\Delta X) + 1/6(\Delta X)^3$$

Thus, to perform the cubic interpolation when the input pixels are equally spaced, it is not necessary to solve a system of equations for the polynomial coefficients and then to evaluate the cubic polynomial at the desired location. Instead, the combination coefficients for the four points surrounding the output location can be calculated using Equations 18 and 28 and then used with Equation 27 to calculate the output value.

Even with the method, there are many arithmetic operations involved in the interpolation since there are many operations needed to generate the combination coefficients for a given $(\Delta X)$. However, this latter computational burden (the operations involved in generating the coefficients) can be eliminated. This is done by precalculating the coefficients for a set of values of $\Delta x$, and storing these in a table. When coefficients for a particular value of $\Delta x$ are needed, the coefficents for the nearest table entry are used. Alternatively, linear interpolation between table entries could be used.

It has been found that for a particular application cubic interpolation usig 64 sets of precalculated combination coefficients performs very well. Following is a table of combination coefficients for cubic interpolation at 64 equally spaced values of $\Delta x$:

| $\Delta X$ | $Z_1$ | $Z_2$ | $Z_3$ | $Z_4$ |
|---|---|---|---|---|
| .00000 | .00000 | 1.00000 | .00000 | .00000 |
| .01563 | −.00509 | .99195 | .01575 | −.00260 |
| .03125 | −.00993 | .98341 | .03172 | −.00520 |
| .04688 | −.01454 | .97442 | .04792 | −.00780 |
| .06250 | −.01892 | .96497 | .06433 | −.01038 |
| .07813 | −.02307 | .95507 | .08094 | −.01294 |
| .09375 | −.02699 | .94475 | .09773 | −.01549 |
| .10938 | −.03069 | .93400 | .11470 | −.01801 |
| .12500 | −.03418 | .92285 | .13184 | −.02051 |
| .14063 | −.03745 | .91130 | .14912 | −.02297 |
| .15625 | −.04051 | .89937 | .16655 | −.02541 |
| .17188 | −.04337 | .88706 | .18411 | −.02780 |
| .18750 | −.04602 | .87439 | .20178 | −.03015 |
| .20313 | −.04848 | .86137 | .21956 | −.03246 |
| .21875 | −.05074 | .84801 | .23744 | −.03471 |
| .23438 | −.05280 | .83432 | .25540 | −.03692 |
| .25000 | −.05469 | .82031 | .27344 | −.03906 |
| .26563 | −.05639 | .80600 | .29153 | −.04115 |
| .28125 | −.05791 | .79140 | .30968 | −.04317 |
| .29688 | −.05925 | .77651 | .32786 | −.04512 |
| .31250 | −.06042 | .76135 | .34607 | −.04700 |
| .32813 | −.06143 | .74594 | .36429 | −.04880 |
| .34375 | −.06227 | .73027 | .38252 | −.05052 |
| .35938 | −.06295 | .71437 | .40074 | −.05216 |

-continued

| ΔX | Z₁ | Z₂ | Z₃ | Z₄ |
|---|---|---|---|---|
| .37500 | −.06348 | .69824 | .41895 | −.05371 |
| .39063 | −.06385 | .68190 | .43712 | −.05517 |
| .40625 | −.06407 | .66536 | .45525 | −.05653 |
| .42188 | −.06415 | .64863 | .47332 | −.05780 |
| .43750 | −.06409 | .63171 | .49133 | −.05896 |
| .45313 | −.06389 | .61463 | .50927 | −.06001 |
| .46875 | −.06355 | .59740 | .52711 | −.06096 |
| .48438 | −.06309 | .58002 | .54486 | −.06179 |
| .50000 | −.06250 | .56250 | .56250 | −.06250 |
| .51563 | −.06179 | .54486 | .58002 | −.06309 |
| .53125 | −.06096 | .52711 | .59740 | −.06355 |
| .54688 | −.06001 | .50927 | .61463 | −.06389 |
| .56250 | −.05896 | .49133 | .63171 | −.06409 |
| .57813 | −.05780 | .47332 | .64863 | −.06415 |
| .59375 | −.05653 | .45525 | .66536 | −.06407 |
| .60938 | −.05517 | .43712 | .68190 | −.06385 |
| .62500 | −.05371 | .41895 | .69824 | −.06348 |
| .64063 | −.05216 | .40074 | .71437 | −.06295 |
| .65625 | −.05052 | .38252 | .73027 | −.06227 |
| .67188 | −.04880 | .36429 | .74594 | −.06143 |
| .68750 | −.04700 | .34607 | .76135 | −.06042 |
| .70313 | −.04512 | .32786 | .77651 | −.05925 |
| .71875 | −.04317 | .30968 | .79140 | −.05791 |
| .73438 | −.04115 | .29153 | .80600 | −.05639 |
| .75000 | −.03906 | .27344 | .82031 | −.05469 |
| .76563 | −.03692 | .25540 | .83432 | −.05280 |
| .78125 | −.03471 | .23744 | .84801 | −.05074 |
| .79688 | −.03246 | .21956 | .86137 | −.04848 |
| .81250 | −.03015 | .20178 | .87439 | −.04602 |
| .82813 | −.02780 | .18411 | .88706 | −.04337 |
| .84375 | −.02541 | .16655 | .89937 | −.04051 |
| .85938 | −.02297 | .14912 | .91130 | −.03745 |
| .87500 | −.02051 | .13184 | .92285 | −.03418 |
| .89063 | −.01801 | .11470 | .93400 | −.03069 |
| .90625 | −.01549 | .09773 | .94475 | −.02699 |
| .92188 | −.01294 | .08094 | .95507 | −.02307 |
| .93750 | −.01038 | .06433 | .96497 | −.01892 |
| .95313 | −.00780 | .04792 | .97442 | −.01454 |
| .96875 | −.00520 | .03172 | .98341 | −.00993 |
| .98438 | −.00260 | .01575 | .99195 | −.00509 |

In this method of interpolation, then, for a desired output pixel location $\hat{x}$, the first pixel to the left, $x_k$, is identified, $\Delta x$ is calculated using Equation 18 (note that the pixel spacing $\Delta p$ is usually normalized to unity so no division is necessary), the four combination coefficients for the table entry with a value of x closest to the calculated value are found, and these coefficients are used along with the values for the four pixels surrounding $\hat{x}$ in Equation 27 to calculate the output value.

Referring again to FIG. 1, a value for the interim pixel 15 is first calculated using $\Delta x$ and the values of the four adjacent old pixels 11, 12, 13, and 14 (for a third order polynomial). Similarly, values for interim pixels 17, 18 and 19 are calculated. A final pixel value is obtained for pixel 16 from the polynomial interpolation along the y-axis using the values of the pixels 17–19 and the offset $\Delta y$.

This procedure is illustrated in the computer system of FIG. 2. The new pixel 16 from FIG. 1 is located in the matrix map 20 using the matrix 10 of FIG. 1. The x-offset ($\Delta x$) is located at 22, and the y-offset ($\Delta y$) is located at 24. The interim pixel values are then determined at 26 using the x-offset, $\Delta x$, coefficients from the table of coefficients 28, and the values of the sixteen adjacent pixels. The final pixel value of pixel 16 is obtained at 30 using the interim pixel values from 26, the y-offset, $\Delta y$, and coefficients from the table 28.

FIG. 3 is a flow diagram for performing one dimensional interpolation using the present invention. The location $x_o$ of the first output pixel within the input array, the increment $\Delta \hat{x}$ between output points, the number N of outputs desired and the input pixel values $\{V_k\}$ are provided as inputs at 40. Initialization occurs at 42 wherein the output pixel counter j is set to 1 and the output pixel location $\hat{x}$ is set to $x_o$. Next, the index k of the pixel to the left of $\hat{x}$ is calculated at 44. Here IFIX($\hat{x}$) refers to the largest integer less than or equal to $\hat{x}$. The distance $\Delta x$ of the output pixel from its left neighbor is also calculated at 44. Coefficients from the table of coefficients 46 are retrieved at 47 and applied in the polynomial equation using the values of the four adjacent input pixels as shown in 48 to obtain the new pixel value OUT$_j$. At 58, j is compared to N. If j is equal to N then the task is completed. If it is not, the output pixel index j and location $\hat{x}$ are incremented at 52.

Attached hereto and incorporated by reference is a program listing for creating the table of coefficients and a program listing for image interpolation using a third order polynomial function. Both programs have been implemented in a Data General S 140 computer as emplyed in the General Electric CT 9800 Computerized Tomographic Scanning System.

Figure 4:
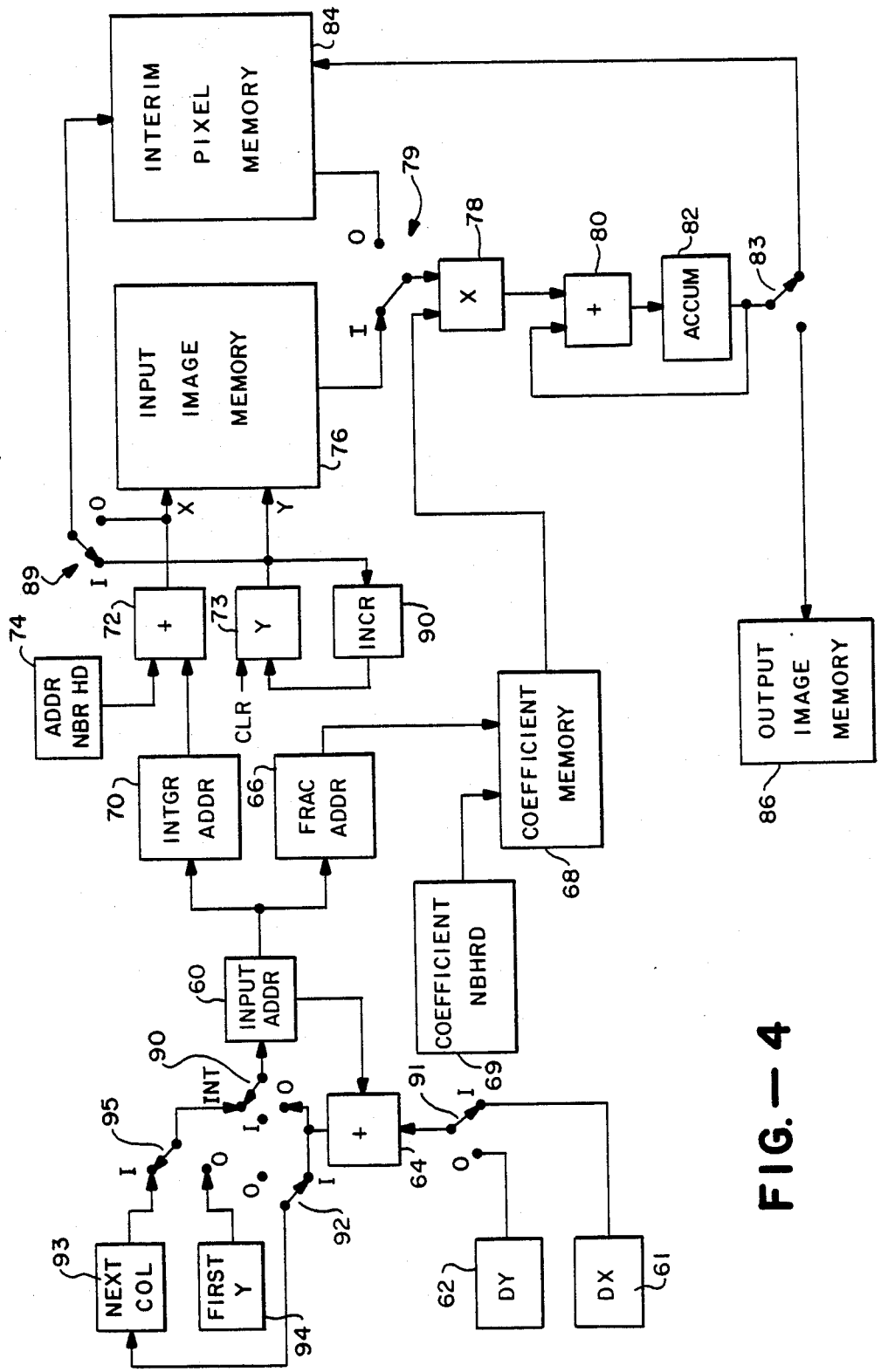
FIG. 4 is a schematic diagram of one embodiment of the invention.

FIG. 4 is a schematic diagram of one embodiment of apparatus in accordance with the invention which operates as described above. In this embodiment interim pixel values are derived for each column of the new matrix along the pixel rows of the old matrix based on interpolation of old pixel values. Then the final values of pixels in each column are derived based on interpolation of the interim values. The apparatus operates column by column in calculating the interium pixel values and the final pixel values.

As will be described, many of the same elements are used to calculate both interim pixel values and final pixel values. First the x and y coordinates of the upper left-most output pixel (in terms of the input pixel array) are loaded into the next column register 93 and the first y register 94, respectively. Similarly, the distance between output pixels in the x and y directions are loaded into the Dx register 61 and Dy register 62, respectively.

To calculate interim pixels for the first column, switches 91, 92, 95, 89, 79 and 83 are set to their I positions. Switch 90 is set to the INT position to load the input address register 60 with the contents of the next column register and then is moved to the I position. The y register 73 is cleared. The input address register now contains the x coordinate of the first output column which is added to Dx at 64 and stored in the next column register in preparation for the next output column. The input address register is comprised of an integer part and a fractional part since it may lie between two columns of the old matrix.

The fractional portion of the X address is applied through register 66 to address the coefficient memory 68. Assuming an interpolation of four values, four coefficients will be read from memory as the coefficient neighborhood address 69 is clocked through values 0, 1, 2, 3, as will be described below.

The integer portion of the X input is applied through register 70 and combined in sequence at 72 with the address neighborhood (e.g. −1, 0, 1, 2) from 74 and the sum is used along with the y register 73 to address the input image memory 76 for obtaining the four input pixel values for interpolation.

The address neighborhood 74 and coefficient neighborhood 69 are clocked and synchronized to present four pairs of coefficients and pixel values to multiplier 78. The four products are added at 80 and accumulated at 82. The resulting interim pixel value is stored at 84 using the y register 73 as an address. The accumulator 82 is cleared, the y address 73 is incremented and the next interim pixel is calculated.

This process is repeated until all interim pixels for this column have been calculated and stored in 84. The final pixel values for this column are then calculated. Switches 91, 92, 95, 89, 79, and 83 are set to their 0 positions. Switch 90 is set to the INT position and the contents of the FIRST y register 94 are loaded into the input address register 60. Switch 90 is then set to the 0 position. The input image memory 76 and the y register 73 are not used in this step. The accumulator 82 is cleared in order to calculate the first output pixel value.

Again, the value of register 60 is separated into integer and fractional parts. The fractional part is used to select coefficients from table 68 and the integer part is added to the address neighborhood and the sum is used to address the interim pixel memory. By clocking the address and coefficient neighborhood registers through their values ($-1, 0, 1, 2$) and ($0, 1, 2, 3$) respectively and summing the product of interim pixel value and coefficient pairs a final pixel value is produced at 82 and stored in the output image memory 86. The accumulator 82 is then cleared, the input address 60 is incremented by DY by adder 64 and the next output pixel is calculated. The process continues until all output pixels for this column are calculated.

Then the processes of calculating interim pixel values and final values in the next column are performed. Switches 91, 92, 95, 89, 79, and 83 are set to their I positions. Switch 90 is used to load register 60 with the x coordinate of this column, the y register 73 is cleared and the x coordinate of the next column is calculated at 64 and stored at 93. The steps that follow are obvious to one skilled in the art.

The device of FIG. 4 as described is best suited for image magnification, minification or stretching in one of the cartesian directions. It can be modified by one skilled in the art to allow a more general alteration of spatial characteristics. The device of FIG. 2 can be used for any of the tasks described above.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In the process of changing spatial characteristics of a pixel defined image such as the magnification and minification of pixel defined images, a method of computing values for new pixels based on old pixel values of an image when the spatial characteristics of the image are changed, said method comprising the steps of
    establishing an equation for polynomial interpolation of a value of a new pixel based on values of a plurality of old pixels neighboring said new pixel,
    precalculating a plurality of sets of weighting coefficients for said old pixels based on said equation and on the relative location of a new pixel with respect to the old pixels, and
    applying a set of weighting coefficients to values of neighboring old pixels for each new pixel based on the relative location of each new pixel with respect to the old pixels.

2. The method as defined by claim 1 wherein said equation for polynomial interpolation includes all terms up to nth order in any coordinate.

3. The method as defined by claim 1 wherein said interpolation is performed by sequential one dimensional polynomial interpolation steps.

4. The method as defined by claim 3 wherein said one dimensional polynomial interpolation is of order n and (n+1) input values are used to calculate each output value.

5. The method as defined by claim 3 wherein said one dimensional interpolation is performed by:

$$f(x) = z_1 v_1 + z_2 v_2 + z_3 v_3 + z_4 v_4$$

where
    $z_i$ is the weighting coefficient for the ith neighboring input value,
    $v_i$ is the ith neighboring input value, and where the values $\{z_i\}$ depend on the relative location of the output point with respect to the input points.

6. Apparatus for computing values for pixels in a new matrix based on pixel values in an old matrix of an image when the spatial characteristics of the image are changed, said apparatus comprising
    means for mapping pixels of said new matrix in said old matrix,
    means for determining offsets of each pixel of the new matrix from a pixel in an old matrix,
    means for establishing values for interim pixels by polynomial interpolation along one axis using pixel values in the old matrix, said means including a table of sets of coefficients for weighting values of pixels in the old matrix based on the offset of the interim pixel from an adjacent pixel in said old matrix, and
    means for establishing a final value of each pixel of said new matrix by polynomial interpolation along another axis using said interim values.

7. Apparatus as defined by claim 6 wherein said means for establishing an interim value and said means for establishing a final value comprise a programmed computer.

8. Apparatus as defined by claim 6 wherein said polynomial interpolation is of order n and value of n+1 pixels of said old matrix are weighted by said coefficients in obtaining interim values and n+1 interim values are weighted in obtaining each final value.

* * * * *

UNITED STATES PATENT AND TRADEMARK OFFICE
CERTIFICATE OF CORRECTION

PATENT NO.   : 4,653,013
DATED        : March 24, 1987
INVENTOR(S)  : Arthur K. Collins, Norbert J. Pelc, Susan T. Wallenslager It is certified that error appears in the above-identified patent and that said Letters Patent is hereby corrected as shown below:

Column 2, lines 66-68 (Equation 2) should read as follows:

$$f(\hat{x}, \hat{y}) = \hat{a}_0 + \hat{a}_1 \hat{x} + \hat{a}_2 \hat{x}^2 + \hat{a}_3 \hat{y} + \hat{a}_4 \hat{y}^2$$
$$+ \hat{a}_5 \hat{x} \hat{y} + \hat{a}_6 \hat{x}^2 \hat{y} + \hat{a}_7 \hat{x} \hat{y}^2 + \hat{a}_8 \hat{x}^2 \hat{y}^2 \qquad (2)$$

Column 6, lines 16-21 (Equation 28) should read as follows:

$$Z_1 = -1/3(\Delta X) + 1/2(\Delta X)^2 - 1/6(\Delta X)^3$$
$$Z_2 = 1 - 1/2(\Delta X) - (\Delta X)^2 + 1/2(\Delta X)^3$$
$$Z_3 = \Delta X + 1/2(\Delta X)^2 - 1/2(\Delta X)^3 \qquad (28)$$
$$Z_4 = -1/6(\Delta X) + 1/6(\Delta X)^3$$

Signed and Sealed this

Ninth Day of February, 1988

*Attest:*

DONALD J. QUIGG

*Attesting Officer*  *Commissioner of Patents and Trademarks*